Jan. 10, 1956 L. F. CAMPBELL 2,729,939
RIBLESS PULSE JET VALVE GRID
Filed June 9, 1952 2 Sheets-Sheet 1
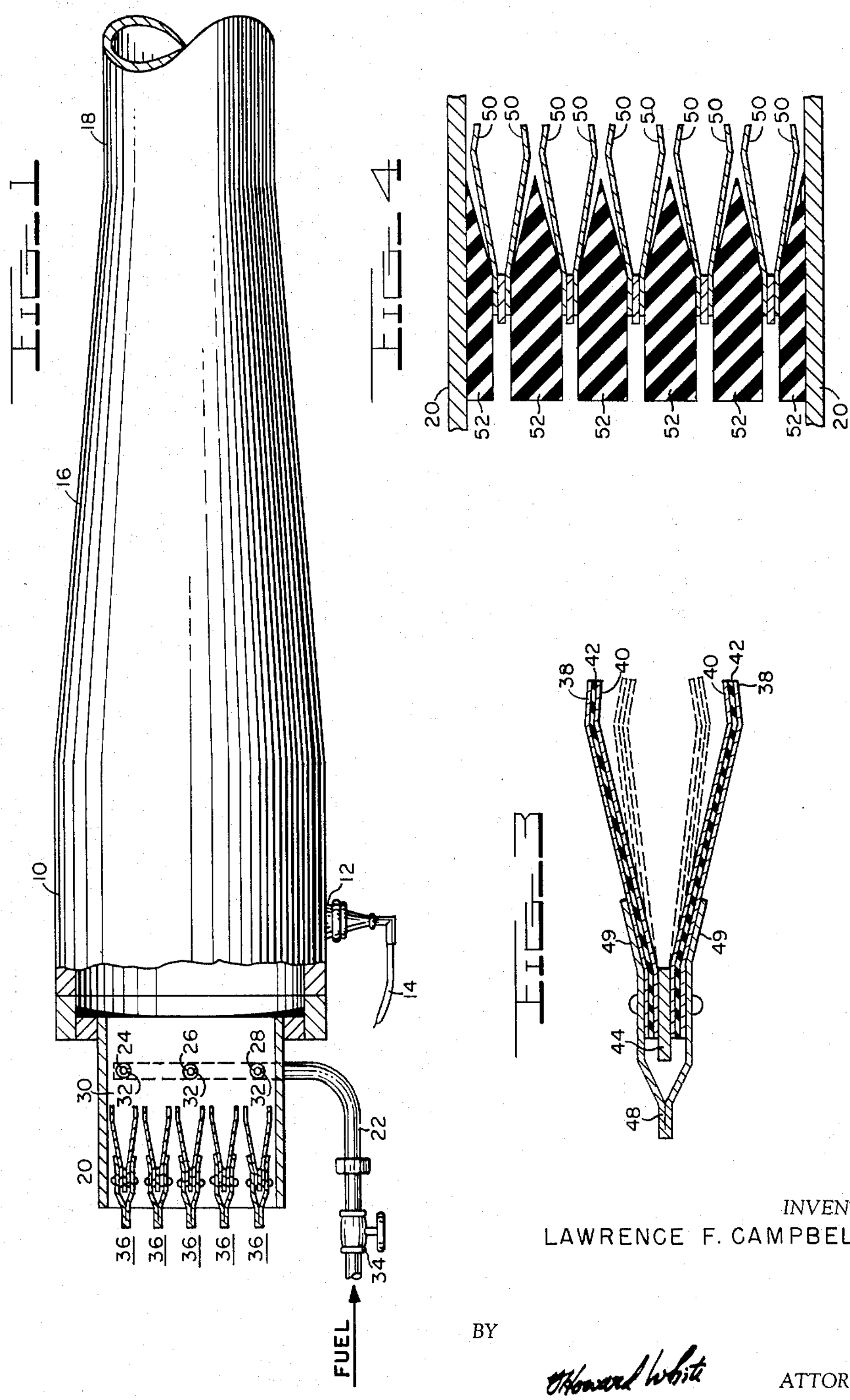
INVENTOR
LAWRENCE F. CAMPBELL
BY
Howard White
ATTORNEY Jan. 10, 1956 L. F. CAMPBELL 2,729,939
RIBLESS PULSE JET VALVE GRID
Filed June 9, 1952 2 Sheets-Sheet 2
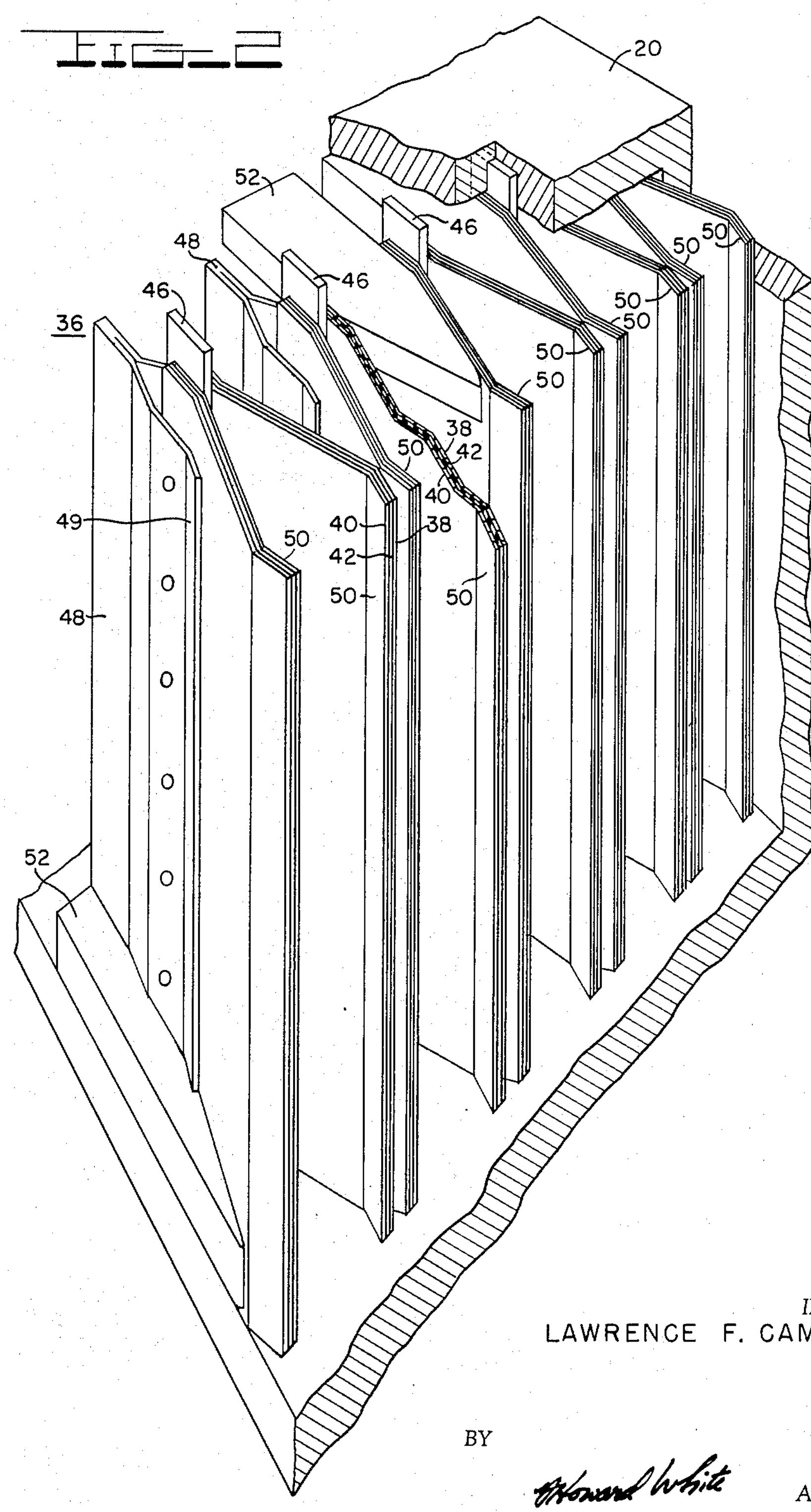
INVENTOR
LAWRENCE F. CAMPBELL
BY
Howard White
ATTORNEY

United States Patent Office 2,729,939
Patented Jan. 10, 1956

1

2,729,939

RIBLESS PULSE JET VALVE GRID

Lawrence F. Campbell, Silver Spring, Md.

Application June 9, 1952, Serial No. 292,597

10 Claims. (Cl. 60—39.77)

(Granted under Title 35, U. S. Code (1952), sec. 266)

This invention relates to a pulse-jet engine and in particular to a check or flapper valve bank for use with a pulse-jet engine.

Pulse-jet engines are extremely simple in construction and consist generally of only three elements, namely: a check or flapper valve bank, a combustion chamber and a tail pipe. The check or flapper valve bank which controls the admission of air to the combustion chamber is mounted in the front end of the pulse-jet engine. Behind the check valve bank, a cylindrical combustion chamber is mounted into which air and fuel are admitted. Connected to the rear of the combustion chamber by a conical section is the tail pipe. In operation, air and fuel are mixed in the combustion chamber and ignited. A rapid increase in pressure occurs when the mixture is ignited closing the valves and forcing the hot gases out through the tail pipe to produce a high velocity jet. During the period the hot gases are being forced out, the pressure in the combustion chamber drops below the outside pressure and the check valve bank will open admitting a fresh charge of air. Once initiated, the operation of the pulse-jet is self-sustaining, as ignition occurs automatically. Although the operation of a pulse-jet engine is basically simple, nevertheless, the useful life of the engine has been characterized in the past by extremely short life because of rapid fatiguing of the valve bank. The primary reason for check valve failure in the past has been found to be the wear caused by the metal-to-metal contact introduced by the ribs inserted between pairs of metal flapper vanes and against which the vanes strike from the force of combustion. The vane edges quickly wore away from striking against each other and the metal ribs. Further the ribs were interposed in the air admission path to the engine and the great amount of metallic surface exposed to the incoming air resulted in a great deal of friction between the valve ribs and the air with a resultant loss of efficiency. It is therefore an object of this invention to provide a check valve bank of ribless construction which is characterized by extremely long life.

It is a further object of this invention to provide a pulse-jet engine having a ribless check valve bank which is simple in construction and operation and is also capable of withstanding high temperatures and pressures for extremely long periods of time.

It is a further object of this invention to provide a pulse-jet engine having a ribless flexible reed valve bank in which there is a minimum of metal-to-metal contact with its resultant wear.

It is a further object of this invention to provide a pulse-jet engine having a ribless flexible reed valve bank wherein each vane comprises a resilient material interposed between two metal plates.

It is a further object to this invention to provide a pulse-jet engine having a novel valve bank in which the vanes strike against resilient bumpers disposed outside the air admission path.

It is a further object of this invention to provide a pulse-jet engine having a novel valve bank in which the vanes strike each other in a curved surface displaced from the vane edges.

2

Other objects and features of this invention will become apparent upon a careful consideration of the following description, when taken together with the accompanying drawings in which:

Figure 1 is a plan view partly in section of the pulse-jet engine;

Figure 2 is a fragmentary perspective view of the frame and valve assembly;

Figure 3 is a sectional view illustrating details of construction of the valve vane assembly;

Figure 4 is a plan view of the bumper assembly.

The invention, in broad terms, contemplates a ribless flexible reed valve bank for pulse-jet engines. The valve bank is made up of a plurality of vane assemblies. Each vane assembly includes a pair of spring metal vanes fastened together at one end and biased apart at the other. Each vane is composed of a pair of contiguous spring metal plates separated by a layer of resilient cloth, so that when assembled the inner metal plates are exposed to the flame from the combustion chamber and the outer metal plates strike the outer plates of adjacent vanes when the valves close. Each pair of vanes is clamped at one end to a slender bar by which the vane assembly is mounted in the valve bank. The clamping of the vanes is accomplished by a stiff metal Y-shaped member wrapped around the outside of the vane assembly at the bar end thereof. The arms of this Y member are bolted to the bar through the vanes. The vane pairs of each assembly have a reentrant bend at their movable ends so that contact between adjacent vane assemblies is limited to the line of the bend. The impact of the vanes is cushioned by resilient bumpers located in the valve bank housing to support the sides of the vanes when the valves are closed.

Reference is had to Figure 1, which discloses a cylindrical member 10 which forms the combustion chamber of the pulse-jet engine. Mounted on the cylindrical wall of the combustion chamber 10 is a spark plug 12 with a wire 14 connecting it to a source of electrical energy (not shown). Welded or otherwise attached to the rear of the combustion chamber 10 is a frusto conical pipe member 16. Tail pipe 18 which is a cylindrical member and constitutes the exhaust nozzle of the pulse-jet engine is attached to the smaller end of the frusto conical member 16.

At the forward end of the combustion chamber 10 there is in open communication with and attached thereto a rectangular housing or frame 20 centrally disposed on the longitudinal axis of the combustion chamber 10 and the tail pipe 18. A fuel conduit 22 mounted on housing 20 has branch conduits 24, 26 and 28 which extend into the mixing chamber 30 formed by the housing 20. Each of the fuel conduits 24, 26 and 28 has numerous longitudinally disposed nozzle openings 32 through which fuel is discharged into the mixing chamber 30 where the fuel is mixed with the air to form an explosive mixture. The fuel conduit 22 is connected to a supply tank (not shown). A control valve 34 in the fuel conduit 22 controls the rate of flow of fuel to the discharge nozzles 32.

As can be seen from Figures 1 and 2, a valve bank for controlling the flow of air into the mixing chamber 30 is located in the housing or frame 20. This valve bank consists of a plurality of flexible vane assemblies 36. As is clearly shown in Figs. 2 and 3 each assembly 36 is made up of a pair of rectangular laminated vanes. Each laminated vane is composed of a pair of contiguous metal plates 38 and 40 separated by a layer of silicone cloth 42. Each plate facing the combustion chamber may be called a combustion plate. Each plate facing the air intake side is forced in contact with a corresponding face of an adjacent assembly when the valves close and may be called a striking plate. Disposed between and contiguous with each striking plate 38 and its respective combustion plate 40 is a resilient layer 42. The layer 42 may be a sheet of Fiberglas cloth impregnated with silicone rubber, more commonly referred to as silicone cloth. It should be noted that in Fig. 2, the vane assemblies 36 are shown in their closed position. In Fig. 3, the dotted lines represent a vane assembly 36 in its normally open position and the solid lines represent the assembly in its closed valve position.

The valve bank for the pulse-jet engine is made up of a plurality of vane assemblies 36. Each vane assembly includes a pair of spring metal vanes fastened together at one end and biased apart at the other end. Each vane is composed of a pair of contiguous spring metal plates separated by a layer of silicone cloth 42. The plates as well as the silicone cloth members 42 are rectangular in elevation as viewed in Fig. 2. As can be seen from Fig. 3, the vane assembly 36 resembles a modified Y in cross-section. The forward end of the vane assembly 36 forming the stem of the Y and the vanes forming the arms of the Y. At the stem of the Y, each pair of vanes is clamped at one end to a slender bar 44 which extends beyond the vanes as indicated at 46, and by which extended portions the vane assembly is mounted in the valve bank. The clamping of the vanes is accomplished by a Y-shaped metal keeper 48 wrapped around the outside of each vane at the bar end thereof. The keeper, vane ends, and bar are rigidly held together by bolts as shown.

The arms of the Y-shaped metal keeper 48 form a channel into which the vanes and vane bar 44 may be inserted. The stem-end of the Y-shaped metal keeper serves to streamline the valve assembly for the flow of air through the valve bank. Rearward of the keeper channel, the keeper arms 49 extend part way up the striking plates to support the vanes against the forces of combustion and act as springs to bias the vane assemblies to their normal position.

At the arm end of the modified Y section where the vanes are biased apart, the vane pairs of each assembly have short inturned flanges 50. This reentrant bend of the vane pairs is provided to insure that contact between adjacent vane assemblies is limited to the line of the bend. By so providing contact at the line of the bend, wear is placed on a curved surface displaced from the vane edges and removed from the vane edges where the metal is likely to be crystallized when the plates are made and is subject to rapid deterioration.

In order to further reduce and hold the metal-to-metal contact of adjacent striking plates 38 to as low a value as possible, resilient bumpers 52 have been attached to the sides of housing 20. As can be seen from reference to Figure 4, bumpers 52 are placed between each of the adjacent striking plates 38 and between the first striking plate 38 and the housing 20 and the last striking plate 38 and the housing 20. The bumpers 52 are extremely small in width in comparison to the width of the plates in valve 36 and are disposed outside the air admission path. This is clearly shown in Figure 2. These resilient bumpers 52 reduce the force of the metal-to-metal contact of adjacent striking plates 38 while not themselves contributing to the wear or deterioration of the vanes. The bumper must, of course, be made of heat resistant material, and neoprene has been found very satisfactory for this purpose.

The operation of the pulse-jet engine is as follows: Fuel flows past the manual valve 34 in the fuel conduit 22 into the branch fuel conduits 24, 26 and 28. There it is discharged into the mixing chamber 30 through the nozzle openings 32 where the fuel is vaporized and mixed with the incoming air to form a charge. The incoming air is admitted to the mixing chamber 30 through the valve bank made up of a plurality of flexible reed valves 36. The explosive mixture is ignited the first time by the spark plug 12. Thereafter the explosive mixture is self-sustaining being ignited by the residual hot gases present from the previous explosion. The gas pressure caused by the explosion is exerted in all directions and strikes the combustion plates 40 of the reed valves 36 with great force. These plates 40 are swung outwardly by the force of the explosion. In being driven outwardly combustion plates 40 also force the striking plates 38 outwardly. However, because of the presence of the silicone cloth members 42, the combustion plates 40 do not wear on the striking plates 38. The silicone cloth members 42 act as a seat for the combustion plates 40. The striking plates 38 are driven outwardly until the adjacent striking plates 38 contact each other. The adjacent striking plates 38 touch each other at their line-of-bend which is the start of the short inturned flanges 50. This is the only place the striking plates 38 will be in direct contact because the resilient bumpers 52 and the valve keeper 48 act as secondary springs to take up the rest of the explosive force. Once the striking plates 38 contact each other, the valve bank is closed and the explosive gases are permitted to escape to the atmosphere only through the tail pipe 18. The reactive force set up by this discharge of the gases in one direction causes the pulse-jet engine to move in an opposite direction.

As the hot explosive gases flow to the tail pipe 18, the pressure in the mixing chamber 30 drops, causing the flexible reed valves 36 to open to admit a fresh charge of air. The cycle is now repeated.

Thus it can be seen that a novel pulse-jet valve bank has been produced which has no intermediate rib structure to cut down the amount of air the valve bank can handle. Further the novel valve bank is characterized by extremely long life since the vane contact is cushioned and there is very little metal-to-metal contact present in the operation of the valve bank.

While a preferred embodiment of the novel invention has been disclosed for the purposes of illustration, it is to be clearly understood that various changes in details of construction and arrangement of parts may be made without departing from the scope of the invention as set forth in the appended claims.

The invention described herein may be manufactured and used by or for the Government of the United States of America for governmental purposes without the payment of any royalties thereon or therefor.

What is claimed is:

1. A valve bank for use as the air intake to the combustion chamber of a pulse-jet engine comprising a frame, a plurality of valve assemblies, a series of parallel bars each positioning one of said valve assemblies within said frame, each valve assembly having a pair of contiguous metal plates secured to each side of its respective bar for producing a valve closure in cooperation with its adjacent assembly and in response to explosions occurring within said combustion chamber of the pulse-jet engine, and resilient means disposed between each pair of plates.

2. A valve bank for use as the air intake to the combustion chamber of a pulse-jet engine comprising a frame, a plurality of valve assemblies, a series of parallel bars each positioning one of said valve assemblies within said frame, each valve assembly having a pair of spring-metal plates secured to each side of its respective bar for producing a valve closure in cooperation with its adjacent assembly and in response to explosions occurring within said combustion chamber of the pulse-jet engine, each valve assembly having its pairs of plates biased apart to form a modified Y in cross-section with the bar portion forming the stem of the Y, short inturned flanges formed in the Y arm ends of the pairs of plates to permit metal-to-metal contact between the plates of adjacent assemblies only along the line-of-bend of said flanges, and resilient means disposed between each pair of plates.

3. A valve bank for use as the air intake to the combustion chamber of a pulse-jet engine comprising a frame, a plurality of valve assemblies, a series of parallel bars each positioning one of said valve assemblies within said frame, each valve assembly having a pair of spring-metal plates secured to each side of its respective bar for producing a valve closure in cooperation with its adjacent assembly and in response to explosions occurring within said combustion chamber of the pulse-jet engine, said spring-metal plates being of rectangular shape in elevation, each valve assembly having its pairs of plates biased apart to form a modified Y in cross-section with the bar portion forming the stem of the Y, short inturned flanges formed in the Y arm ends of the pairs of plates to permit metal-to-metal contact between the plates of adjacent assemblies only along the line-of-bend of said flanges, and resilient means disposed between each pair of plates.

4. A valve bank for use as the air intake to the combustion chamber of a pulse-jet engine comprising a frame, a plurality of valve assemblies, a series of parallel bars each positioning one of said valve assemblies within said frame, each valve assembly having a pair of spring-metal plates secured to each side of its respective bar for producing a valve closure in cooperation with its adjacent assembly and in response to explosions occurring within said combustion chamber of the pulse-jet engine, a channel member surrounding each respective bar and supporting the spring-metal plates, said spring-metal plates being of rectangular shape in elevation, each valve assembly having its pairs of plates biased apart to form a modified Y in cross-section with the bar portion forming the stem of the Y, short inturned flanges formed in the Y arm ends of the pairs of plates to permit metal-to-metal contact between the plates of adjacent assemblies only along the line-of-bend of said flanges, and resilient means disposed between each pair of plates.

5. A valve bank for use as the air intake to the combustion chamber of a pulse-jet engine comprising a frame, a plurality of valve assemblies, a series of parallel bars each positioning one of said valve assemblies within said frame, each valve assembly having a pair of spring-metal plates secured to each side of its respective bar for producing a valve closure in cooperation with a plate of its adjacent assembly in response to explosions occurring within the pulse-jet engine, a channel member surrounding each respective bar and supporting the spring-metal plates, said spring-metal plates being of rectangular shape in elevation, each valve assembly having its pairs of plates biased apart to form a modified Y in cross-section with the bar portion forming the stem of the Y, short inturned flanges formed in the Y arm ends of the pairs of plates to permit metal-to-metal contact between the plates of adjacent assemblies only along the line-of-bend of said flanges, and resilient bumpers attached to said frame and disposed between the plates of adjacent valve assemblies to cushion the contact between adjacent assemblies.

6. In a valve bank for use with a pulse-jet engine, a valve assembly comprising, an elongated rod for mounting said assembly in said bank, a first pair of metallic rectangular spring members mounted on each side of said elongated rod, a second pair of metallic rectangular spring members mounted on said elongated rod each contiguous with one of said first members, and a pair of resilient members each sandwiched between a first member and its respective second member.

7. In a valve bank for use with a pulse-jet engine, a valve assembly comprising, a flat elongated rod for mounting said assembly in said bank, a first pair of metallic rectangular spring members mounted on each side of said elongated rod, a second pair of metallic rectangular spring members mounted on said elongated rod each contiguous with one of said first members, and a pair of resilient members each sandwiched between a first member and its respective second member, each adjacent first and second metallic member and the associated resilient member having short inturned flanges at the ends remote from said rod.

8. In a valve bank for use with a pulse-jet engine, a valve assembly comprising, a flat elongated rod for mounting said assembly in said bank, a first pair of metallic rectangular spring members mounted on each side of said elongated rod, a second pair of metallic rectangular spring members mounted on said elongated rod each contiguous with one of said first members, and a pair of resilient members each sandwiched between a first member and its respective second member, respective groups of contiguous first and second members being biased apart to form a modified Y in cross-section with said flat rod portion being the stem of the Y, each adjacent first and second metallic member and the associated resilient member having short inturned flanges at the ends of the Y remote from the stem.

9. In a valve bank for use with a pulse-jet engine, a valve assembly comprising, a flat elongated rod for mounting said assembly in said bank, a first pair of metallic rectangular spring members mounted on each side of said elongated rod, a second pair of metallic rectangular spring members mounted on said elongated rod each contiguous with one of said first members, and a pair of resilient members each sandwiched between a first member and its respective second member, respective groups of contiguous first and second members being biased apart to form a modified Y in cross-section with said flat rod portion being the stem of the Y, each adjacent first and second metallic member and the associated resilient member having short inturned flanges at the ends of the Y remote from the stem, and a metallic member enclosing the rod end of the valve assembly to support the spring members.

10. A valve bank for use as the air intake to the combustion chamber of a pulse jet engine comprising a frame, a plurality of valve assemblies, a series of parallel bars each positioning one of said valve assemblies within said frame, each valve assembly having a pair of spring-metal plates secured to each side of its respective bar for producing a valve closure in cooperation with its adjacent assembly and in response to explosions occurring within said combustion chamber of the pulse jet engine, each pair of said spring-metal plates having a resilient member sandwiched therebetween and contiguous therewith, a channel member surrounding each respective bar and supporting the spring-metal plates, each valve assembly having its pairs of plates biased apart to form a modified Y in cross-section with the bar portion forming the stem of the Y, short inturned flanges formed in the Y arm ends of the pairs of plates to permit metal to metal contact between the plates adjacent assemblies only along the line of bend of said flanges, and resilient bumpers attached to said frame and disposed between the plates of adjacent valve assemblies to cushion the contact between adjacent assemblies.

References Cited in the file of this patent

UNITED STATES PATENTS

| | | |
|---|---|---|
| 2,505,757 | Dunbar et al. | May 2, 1950 |
| 2,563,305 | Britton et al. | Aug. 7, 1951 |
| 2,653,805 | Scherberg | Sept. 29, 1953 |

FOREIGN PATENTS

| | | |
|---|---|---|
| 16,167 | Great Britain | Aug. 12, 1901 |
| 573,586 | France | Mar. 13, 1924 |

OTHER REFERENCES

"Project Squid," United States Navy Tech. Memorandum No. Pr-4, published June 30, 1948, page 58.